United States Patent
Reid et al.

(10) Patent No.: US 6,953,553 B2
(45) Date of Patent: Oct. 11, 2005

(54) PROCESS AND APPARATUS FOR SEPARATING DILUENT FROM POLYMER SOLIDS

(76) Inventors: Thomas A. Reid, 1521 Z-Z La., Deer Park, TX (US) 77536; Scott E. Kufeld, 1331 Prospect, Houston, TX (US) 77004; John H. Tait, 12002 Grove Stone Ct., Stafford, TX (US) 77477; David H. Burns, 3374 Maroneal St., Houston, TX (US) 77025; Donald W. Verser, 3375 Bellefontaine, Houston, TX (US) 77025

( * ) Notice: Subject to any disclaimer, the term of this patent is extended or adjusted under 35 U.S.C. 154(b) by 0 days.

(21) Appl. No.: 10/948,015

(22) Filed: Sep. 23, 2004

(65) Prior Publication Data

US 2005/0034968 A1 Feb. 17, 2005

Related U.S. Application Data

(62) Division of application No. 10/662,260, filed on Sep. 15, 2003, now Pat. No. 6,838,531.
(60) Provisional application No. 60/411,255, filed on Sep. 16, 2002.

(51) Int. Cl.$^7$ .............................................. B32B 27/32
(52) U.S. Cl. ......................................... 422/132; 526/64
(58) Field of Search ............................. 422/132; 526/64

(56) References Cited

U.S. PATENT DOCUMENTS

| | | | |
|---|---|---|---|
| 5,376,742 A | 12/1994 | Krause | 526/68 |
| 5,455,314 A | 10/1995 | Burns | 526/61 |
| 5,565,174 A | 10/1996 | Burns | 422/131 |
| 5,624,877 A | 4/1997 | Bergmeister et al. | 502/120 |
| 5,648,439 A | 7/1997 | Bergmeister et al. | 526/96 |
| 6,045,661 A | 4/2000 | Kreischer et al. | 203/73 |
| 6,204,344 B1 | 3/2001 | Kendrick et al. | 526/64 |
| 6,262,191 B1 * | 7/2001 | Hottovy et al. | 526/64 |
| 6,319,997 B1 | 11/2001 | Kendrick et al. | 526/64 |
| 6,420,497 B1 | 7/2002 | Tait | 526/64 |
| 6,559,247 B2 | 5/2003 | Burns | 526/64 |
| 2003/0073787 A1 | 4/2003 | Stephens et al. | 526/65 |

* cited by examiner

*Primary Examiner*—William K. Cheung
(74) *Attorney, Agent, or Firm*—Fletcher Yoder

(57) ABSTRACT

Polymer solids are maintained in an intermediate pressure zone for a desired polymer solids residence time and then transferred to a purge zone or other lower pressure zone. An increase in the polymer solids residence time in the intermediate pressure zone allows more diluent to flash or separate, thereby avoiding or reducing the need for a low pressure flash zone. A fluff chamber may be disposed between the intermediate pressure zone and a lower pressure zone. A transporter tank may be used to transport polymer solids after the intermediate pressure zones.

19 Claims, 3 Drawing Sheets

PROCESS AND APPARATUS FOR SEPARATING DILUENT FROM POLYMER SOLIDS

RELATED APPLICATIONS

This application claims priority to U.S. Provisional Application No. 60/411,255, filed on Sep. 16, 2002, and is a divisional of U.S. Non-Provisional application Ser. No. 10/662,260, filed on Sep. 15, 2003 now U.S. Pat. No. 6,838,531. The 60/411,255 and the Ser. No. 10/662,260 applications are incorporated by reference herein.

FIELD OF INVENTION

The present process and apparatus relate to slurry polymerization, particularly to the separation of diluent from the polymer solids produced in slurry polymerization.

BACKGROUND OF THE INVENTION

Polyolefins such as polyethylene and polypropylene and other polymers may be prepared by particle form polymerization, also referred to as slurry polymerization. In this technique, feed materials such as monomer and catalyst are introduced to a reaction zone, and a fluid slurry comprising solid polyolefin particles in a liquid medium is formed in the reaction zone.

In continuous loop reactors, the various feed materials may be introduced to the loop reaction zone in various ways. For example, the monomer and catalyst may be mixed with varying amounts of diluent prior to introduction to the loop reaction zone. In the loop reaction zone, the monomer and catalyst become dispersed in the fluid slurry. The fluid slurry circulates through the loop reaction zone, and the monomer reacts at the catalyst in a polymerization reaction. The polymerization reaction yields solid polymer particles in a liquid medium, for example, a liquid diluent used to form the fluid slurry.

In order to recover the polymer from a particle form polymerization process, it is necessary to separate the polymer solids from the liquid diluent that make up the effluent slurry withdrawn from the reactor. Typical separation systems include a reduction in pressure so that the liquid diluent vaporizes. The vaporized diluent exits at a top portion of a flash tank. The polymer remains solid, and is recovered through a bottom portion of the flash zone. Other polymer recovery processes utilize multiple stage flash systems. For example, a first intermediate pressure flash zone and a second lower pressure flash zone may be employed. The temperature and the pressure in the first flash zone are such that a major amount of the diluent will be vaporized and that vapor can be condensed without compression by heat exchange with a fluid having a temperature, for example, in the range of from about 40° F. to about 130° F. The polymer particles from the first flash step are then subjected to a lower pressure flash step to vaporize additional remaining diluent.

In a polymer recovery system utilizing one or more flash chambers, it has been common to have some diluent entrained in the polymer leaving the flash chamber(s). It is desirable, however, to obtain polymer product substantially free of diluent. If the polymer leaving the flash chamber contains an excess amount of diluent, the polymer product can become tacky, and then may plug up lines and cause restrictions. Furthermore, in many polymer production processes, polymer solids after the flash chamber are subjected to further processing to remove residual and entrained diluent. Examples of such processing include purge zones, conveyer dryers, and other drying systems known in the art.

One method for removing additional amounts of diluent after the flash chamber involves passing the polymer solids through a purge zone, wherein a non-combustible gas is used to remove the diluent.

Within a typical recovery system, when passing polymer from a higher pressure zone to a lower pressure zone, it is important to maintain a pressure seal between the zones. Otherwise, the pressure will equilibrate between the two zones, or diluent or other material from the higher pressure zone could pass into the next zone, or material from the lower pressure zone could pass up to the higher pressure zone. It is desirable to minimize the amount of gaseous or liquid dilient being passed to a purge zone to reduce the effort to purge such diluent and to ensure the production as an end-product of polymer that is essentially free of such diluent. Also, because at least a portion of the flash gas from the flash zone is often recycled to the reactor, it is desirable to keep purge gas from entering the flash zone.

A technique for maintaining a pressure seal between a higher pressure zone and a lower pressure zone includes the use of a "fluff chamber" or "surge vessel" between the zones. The fluff chamber is generally operated at a normal level of 75 to 85 percent of its capacity of polymer solids. This level is desired to minimize the amount of hydrocarbon gas that would be in the space above the polymer solids.

In association with a fluff chamber, valves are used to control flow of polymer solids (often called "fluff" or "flakes" or "powder") into and out of the fluff chamber in a batch-type process. For example, in some recovery systems, when the fluff chamber inlet valve is open, polymer solids from the flash chamber or other higher pressure tank pass to the fluff chamber, and the fluff chamber outlet valve is closed to maintain a pressure seal. When the fluff chamber outlet valve is open, polymer solids pass out of the fluff chamber, and the pressure inside the fluff chamber is released, but the fluff chamber inlet valve is closed to maintain a pressure seal between the flash zone and the fluff chamber. In this scheme, the fluff chamber inlet and outlet valves are not open simultaneously. By keeping one of the valves always closed, the loss of high pressure diluent into a lower pressure downstream vessel is prevented.

As polymerization reactors get larger and production rates increase, the fluff chamber valves must also get larger and/or must cycle more often, presenting cost and maintenance concerns.

DETAILED DESCRIPTION OF THE INVENTION

Figure 1:
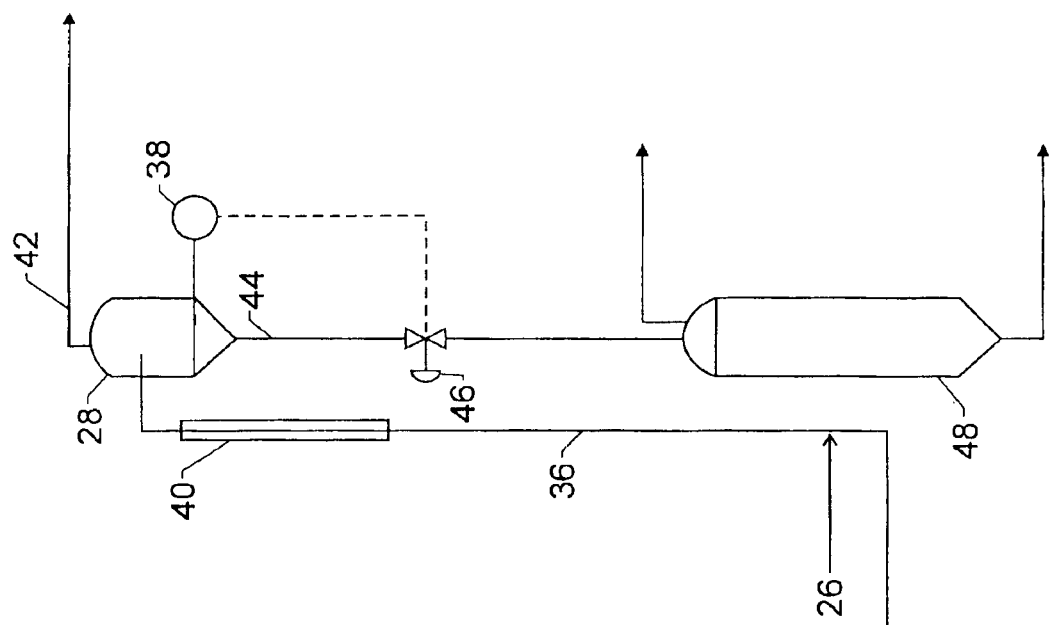
FIG. 1 shows a slurry, polymerization system comprising an intermediate pressure tank and a purge column.
Figure 1:
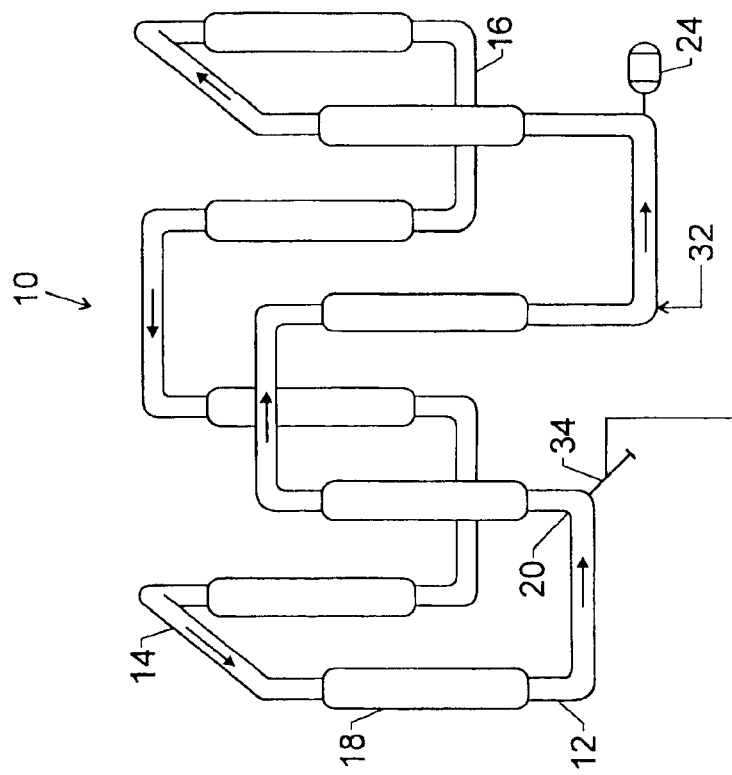

The present invention separates substantially all unentrained diluent from polymer solids in an intermediate pressure zone and transfers the polymer solids from the intermediate pressure zone to a downstream processing zone, such as a purge zone. The use of a low pressure flash zone may be avoided.

The polymer solids can be maintained at a desired level in the intermediate pressure zone. Maintaining the polymer solids at a desired level in the intermediate pressure zone may increase the polymer solids residence time in that zone. Increasing that residence time allows more diluent (preferably, most of the diluent or substantially all the diluent) to be separated from the polymer solids in the intermediate pressure zone, which reduces or eliminates the need for a low pressure flash zone.

The present invention is applicable to any slurry polymerization in a liquid medium. The invention is particularly applicable to olefin polymerizations in a liquid diluent in which the resulting polymer is mostly insoluble under polymerization conditions. Most particularly the invention is applicable to any olefin polymerization in a loop reactor utilizing a diluent so as to produce a slurry of polymer solids and liquid diluent. Suitable olefin monomers are 1-olefins having up to 8 carbon atoms per molecule and no branching nearer the double bond than the 4-position. The invention is particularly suitable for the copolymerization of ethylene and a higher 1-olefin such as 1-butene, 1-pentene, 1-hexene, 1-octene and 1-decene. For example, copolymers can be made from ethylene and 0.01 to 10 weight percent, alternatively 0.01 to 5 weight percent, alternatively 0.1 to 4 weight percent higher olefin based on the total weight of ethylene and comonomer. Alternatively sufficient comonomer can be used to give the above-described amounts of comonomer incorporation in the polymer.

Suitable diluents for use as the liquid medium are well known in the art and include hydrocarbons, which are inert and liquid under reaction conditions. Suitable hydrocarbons include isobutane, propane, n-pentane, i-pentane, neopentane and n-hexane, with isobutane being especially preferred. Additional details regarding loop reactor apparatus and polymerization processes may be found in U.S. Pat. Nos. 4,674,290; 5,183,866; 5,455,314; 5,565,174; 5,624,877; 6,005,061; 6,045,661; 6,051,631; 6,114,501; 6,262,191; and 6,420,497, which are incorporated by reference herein.

Additionally, the present techniques for controlling heavies may be employed where the unreacted monomer is the liquid medium for the polymerization. For example, the present techniques may be used for the polymerization of propylene where propylene is the liquid medium and an inert diluent is not present in any substantial amount. A diluent may still be used for the catalyst. For illustration, but not as a limitation, the present invention will be described in connection with a polyethylene process using an inert diluent as the liquid medium, but it is to be understood that the present invention may also be employed where the monomer is used as the liquid medium and would take the place of the diluent in the following descriptions.

Suitable catalysts for slurry olefin polymerizations are well known in the art. Particularly suitable is chromium oxide on a support such as silica, as broadly disclosed in U.S. Pat. No. 2,825,721 (March 1958), which is incorporated by reference herein. Reference herein to silica supports is meant to also encompass any known silica containing support such as, for instance, silica-alumina, silica-titania and silica-alumina-titania. Any other known support such as aluminum phosphate can also be used. The invention is also applicable to polymerizations using organometal catalysts including those frequently referred to in the art as Ziegler catalysts (or Ziegler-Natta catalysts) and metallocene catalysts.

Additional details regarding loop reactor apparatus and polymerization processes may be found, for example, in U.S. Pat. Nos. 4,424,341; 4,674,290; 5,183,866; 5,455,314; 5,565,174; 5,624,877; 6,005,061; 6,045,661; 6,051,631; 6,114,501; and 6,420,497, which are also incorporated by reference herein.

In slurry polymerizations in a loop reaction zone, the take-off or withdrawal of slurry can be done on an intermittent basis using settling legs as is well known in the art. The slurry may also be taken off continuously, which can be made even more desirable, for instance, by operating the reactor at a high solids concentration. Further, when the withdrawn portion of the slurry has a high solids concentration, this benefits the separation procedure since less diluent needs to be separated from the polymer. The solids concentration of the withdrawn portion generally will be at least about 35 weight percent, more preferably at least 50 weight percent, still more preferably from 50 weight percent to 70 weight percent. Further details regarding continuous take-off of a slurry having a high solids concentration from a loop reaction zone are available in U.S. Pat. No. 6,239,235, which is incorporated by reference herein.

During the recovery of polymer from a slurry loop process, it is advantageous to recover the diluent at a sufficiently high pressure (in other words, an intermediate pressure) so that it can be condensed without compression in a heat exchanger at temperature typically available with cooling tower water. Compression requires energy and investment capital. An intermediate pressure is typically lower than then the pressure within the loop reactor but higher than atmospheric pressure. Additional details regarding the use of an intermediate pressure flash tank are available in U.S. Pat. No. 4,424,341, already incorporated by reference. However, polymer has typically been subjected to a low pressure at some point during the recovery process in order to minimize the amount of residual diluent and other reaction components left on the polymer before extrusion or other processing.

One technique for transferring polymer solids from an intermediate pressure zone to a lower pressure zone is to use two valves with a fluff chamber between the valves. Such a system operates by (1) opening the top valve when the bottom valve is closed; (2) flowing polymer solids into the fluff chamber; (3) closing the top valve while the bottom valve remains closed, until the level of polymer solids in the fluff chamber reaches a desired level, preferably as full as practical. The top valve may be closed based on timing or on a level measurement; (4) thereafter opening the bottom valve while the top valve remains closed, thereby letting down the polymer and any gas (and any non-vaporized diluent or other liquid) to a lower pressure zone or vessel, such as a purge column; and (5) closing the bottom valve when the level of polymer solids in the fluff chamber reaches a desired level, preferably when the fluff chamber is substantially empty. The sequence of opening and closing the valves also may be based on timing or on a level measurement. Process steps (1) to (5) may be repeated as needed to pass the polymer solids from the intermediate pressure zone to the lower pressure zone. The system may also be operated so that the fluff chamber is depressurized before the bottom valve is opened and repressurized before the top valve is opened.

This technique comprising the fluff chamber and valves is efficient in that it reduces or minimizes the loss of pressure in the higher pressure zone due to transfer of polymer solids. It is typically more efficient (that is, less high pressure gas is let down to low pressure per unit amount of polymer) than a continuous system because the present system always has a valve closed between the high-pressure zone and the low-pressure zone. Continuous processes use an open pathway or valves that are open and thus have some constant leakage of high-pressure gas and liquid (if any) between the zones. Maintaining a polymer level in the intermediate pressure tank above the open valve can help avoid pressure loss, but may lead to increased tendency for the valve to plug, due to limited movement of the valve. Further, even with a polymer level maintained, there may still be some leakage of high pressure gas. In the present system, even though valves are provided, it is also advantageous to hold a level in the high-pressure zone during the time when the upper valve is open. The flow of the high-pressure gas to the low-pressure zone is slowed down by the flow through the tortuous path through the level of polymer particles above the valve, should the valve leak when closed.

Surprisingly it may also be advantageous to provide a relatively small flow path for gas from a high pressure flash tank to the fluff chamber and/or from the fluff chamber to the purge column. Although these flow paths result in some pressure loss, they can reduce the pressure drop across the ball valves so that the ball valves can be turned easily, and wear on the valves and actuators is reduced.

The fluff chamber may be designed and constructed so as to avoid polymer build-up or clogging therein. One technique for avoiding polymer build-up or clogging is to include a rotating mixer or scraper. A rotating mixer mixes the polymer solids, and the mixing prevents the polymer solids from remaining stationary too long. A rotating scraper scrapes the sides of the fluff chamber and removes any polymer solids that attach to the sides. Another technique for avoiding polymer solids build-up or clogging is to provide the fluff chamber with a surface finish that facilitates uniform flow of polymer solids from the reactor. An advantage of providing uniform flow through the fluff chamber is that the polymer solids do not segregate and the polymer particles have the same residence time in the fluff chamber, which promotes uniform product composition. The fluff chamber may have a surface finish and angled bottom that are tailored to resin type, to ensure flow of polymer solids out of the fluff chamber. For example, the fluff chamber may have a surface finish of polished carbon steel, stainless steel or other suitable pressure vessel construction material.

FIG. 1 shows a loop reactor 10 having major segments 12, upper minor segments 14 and lower minor segments 16. These upper and lower minor segments define upper and lower zones of flow. The upper and lower minor segments may be horizontal segments which are joined to major segments by elbows. Alternatively, the upper and/or lower segments can be continuously curved structures, such as two elbows joined together. The reactor can be cooled by conventional means such as two-pipe heat exchangers 18. Each segment is connected to the next segment by a smooth bend or elbow thus providing a continuous flow path substantially free from internal obstructions. The polymerization mixture is circulated by means of an impeller (not shown) driven by motor 24. An elongated hollow appendage for continuously taking off an intermediate product slurry is designated broadly by reference character 34. Continuous take-off mechanism 34 is shown located adjacent a downstream end of one of the lower horizontal reactor loop sections 16 and adjacent a connecting elbow.

The continuous take-off appendage is shown at the downstream end of a lower horizontal segment of the loop reactor. Another possible location is on the bottom part of the elbow of a descending (based on the direction of flow) major segment. The location can be just prior to the catalyst introduction point so as to allow fresh catalyst the maximum possible time in the reactor before it first passes a take-off point. However, the continuous take-off appendage can be located on any segment or any elbow. As already noted, however, the present invention is equally applicable to alternative take-off systems, such as settling legs and/or discontinuous non-batch take-off systems.

Preferably, much of the liquid diluent flashes at the continuous take-off appendage as the pressure drops, and remaining liquids are vaporized as heat is added and the pressure further drops in the flashlines before entering the intermediate pressure tank. The intermediate product slurry (reactor effluent) is passed from the continuous take-off appendage 34 via flashline 36 to intermediate pressure chamber 28. In some embodiments, water, hydroxide, alcohol, or other suitable catalyst deactivators are generally injected via water injection conduit 26 to "kill" the catalyst and/or cocatalyst or render it inactive. Since these are catalyst poisons, they must be removed or at least essentially removed from any material recycled to the reactor.

The flashline 36 is surrounded by a heat exchange conduit 40 which is provided with a heated fluid, which provides indirect heating to the material (slurry, vapor, liquid, and solids,) in the flashline 36. This constitutes a "flashline heater" that heats the reactor effluent, or at least prevents an excessive cooling of the effluent, before the effluent passes into the intermediate pressure flash chamber 28. The surrounding conduit 40 may be essentially the same length as the flashline 36 or it may be in short sections.

In some systems utilizing a flashline heater, some or all of the diluent will flash in flashline 36 prior to reaching the intermediate pressure chamber 28. However, the terms "flash chamber" and "flash tank" still are frequently used for the tank that follows the flashline, where vaporized diluent separates from polymer solids. "Flash tank" or "flash chamber" is still used even though there may be little or no "flashing" in the flash tank if all or substantially all of the diluent has already vaporized in the flashline. In current designs which have the flashlines discharging at higher pressures and without downstream drying devices, it is intended to design the flashlines so there is little to no pressure drop on entering the flash tank. Usually the pressure drop in the flashline increases along its distance, as it progresses further from the loop reactor. The vapor is becoming less dense with the decreased pressure, and the velocity of the material increases. Hence the pressure drop per unit distance of line increases to the highest point as the material enters the flash tank. The pressure decreases and flashing can occur all along the flashline heater. Flashing can also occur, although it is not presently preferred, in the flash chamber, but preferably essentially all of the liquids vaporize prior to entering the flash chamber.

Holding polymer solids in a flash tank under intermediate pressure allows time for hydrocarbons entrained in the polymer solids to escape and equilibrate to the concentration in the vapor space. The present process and apparatus may be applied to systems wherein all, substantially all, substantially none, or some portion between all and none of the diluent flashes in the flashline 36 prior to introduction to the intermediate chamber 28. Therefore, the present process and apparatus may be applied to systems in which all, substantially all, substantially none, or a portion between all and none, of the diluent actually flashes in the flash chamber 28.

In the process and apparatus depicted in FIG. 1, flash chamber 28 is an intermediate pressure chamber, for example, the intermediate pressure chamber of a two-stage flash system as set forth in Hanson et al. U.S. Pat. No.

4,424,341, which has been incorporated by reference herein. Preferably, the intermediate pressure chamber or zone can be operated at a pressure within the range of 100–1500 psia (7–1.05 kg/cm$^2$), preferably 125–275 psia (8.8–19 kg/cm$^2$), more preferably 150–250 psia (10.5–17.6 kg/cm$^2$) or 130–190 psia (9.1–13.4 kg/cm$^2$). The intermediate pressure chamber or zone can be operated at a temperature within the range of 100–250° F. (37.8–121° C.), preferably 130–230° F. (54.4–110° C.), more preferably 150–210° F. (65.6–98.9° C.) or 170–200° F. (76.6–93.3° C.). The foregoing valves may be approximate. The narrower ranges are particularly suitable for polymerizations using 1-hexene comonomer and isobutane diluent, and the broader ranges are particularly suitable for higher 1-olefin comonomers and hydrocarbon diluents in general.

Most of the non-solid components of the polymerization effluent will form a vapor that is withdrawn via flash gas line 42. This vapor (or flash gas) is mostly isobutane diluent. It also contains most of the unreacted ethylene and 1-hexene monomers. Polymer solids which contain a small amount of entrained solvent and monomers may be continuously withdrawn via solids outlet 44 which is followed by a solids outlet control valve 46.

The intermediate pressure chamber 28 is equipped with a polymer solids level sensor 38. The level sensor may be any sensor used for measuring the solids level in a tank, including vibration point level sensors, capacitance and time domain reflectometry (TDR) devices that have direct contact with the material being measured, as well as ultrasonic and radar technologies that use non-contacting devices. The level sensor may be a point level measurement sensor or continuous level measurement sensor. Nuclear gamma devices are also suitable and may be set up to measure the level over a wide range.

The flow rate of the polymer solids being withdrawn from the intermediate pressure chamber 28 via the solids outlet 44 is controlled by manipulation of the control valve 46. Manipulation of the control valve may be accomplished by establishing a first signal representative of the actual level of the polymer solids in the flash chamber 28; establishing a second signal representative of a desired level of the polymer solids in the flash chamber 28 (which may be predetermined or inputted manually or automatically calculated based on other parameters); comparing the first signal and the second signal and establishing a third signal responsive to the difference between the first signal and the second signal; and manipulating the control valve responsive to the third signal. The first signal is obtained from the level sensor while the second signal preferably is an input based on the desired polymer solids level. Any type of suitable control system may be used to manipulate the control valve, including stand-alone controllers or integrated systems.

The control system may be configured to manipulate the control valve such that the polymer solids residence time is maintained at a desired level. The polymer solids residence time preferably is maintained at substantially zero to 2 minutes. Alternatively, the polymer solids residence time preferably is maintained in the range of from 10 seconds to 30 minutes. Alternatively, the polymer solids residence time preferably is maintained in the ranges of from 30 to 90 minutes or from 30 to 120 minutes.

By maintaining a desired level of solid olefin polymer particles in an intermediate pressure zone, one can control the polymer solids residence time, which is the average amount of time a polymer particle spends in the intermediate pressure zone. An increase in polymer solids residence time allows flashing and/or separating of more diluent, including more entrained diluent, from the polymer solids, thereby increasing the purity and processability of the polymer exiting the zone. Furthermore, by maintaining a desired level of polymer solids in the intermediate pressure zone, one can create a pressure seal between the zone and downstream equipment. In addition, operating and maintenance costs are reduced by providing a pressure seal between the intermediate pressure zone and purge zone that does not require the use of on/off valves. Additionally, the need for a separate fluff chamber may be eliminated. The pressure seal may rely on the level of polymer solids to restrict the flow of gaseous or liquid (if any present) diluent out of the intermediate pressure zone. The particles of polymer solids may substantially close off the majority of flow path (cross sectional area) available to the diluent. Nonetheless, it is contemplated that a small amount of flow path may be available thorough the small gaps between adjacent particles. This small continuous flow may reduce the ultimate recovery efficiency of diluent in the intermediate pressure zone.

Polymer solids are withdrawn via the solids outlet 44 and passed to a purge column 48, or a purge zone. Purge gas is typically fed to the bottom of the purge column and exits the top of the purge column along with any purged diluent and monomer. Although any suitable non-combustible gas can be employed as the purge gas, a purge gas consisting essentially of nitrogen is preferred.

The present process and apparatus may also be used in a system that includes a fluff chamber utilizing on/off valves to maintain a pressure seal between the intermediate pressure zone and the purge zone. In such a system, a continuous flash zone take-off line (flash zone outlet conduit) may be used as a primary or secondary flash zone take-off line.

In some systems, the polymer solids may be continuously withdrawn from the intermediate pressure zone. The process may include controlling the flow rate of the polymer solids through the intermediate pressure zone solids outlet by manipulating a solids outlet control valve. The process may also include the steps of establishing a first signal representative of the actual level of the polymer solids in the intermediate pressure zone; establishing a second signal representative of a desired level of the polymer solids in the intermediate pressure zone; comparing the first signal and the second signal and establishing a third signal responsive to the difference between the first signal and the second signal; and manipulating the solids outlet control valve in response to the third signal.

Figure 2:
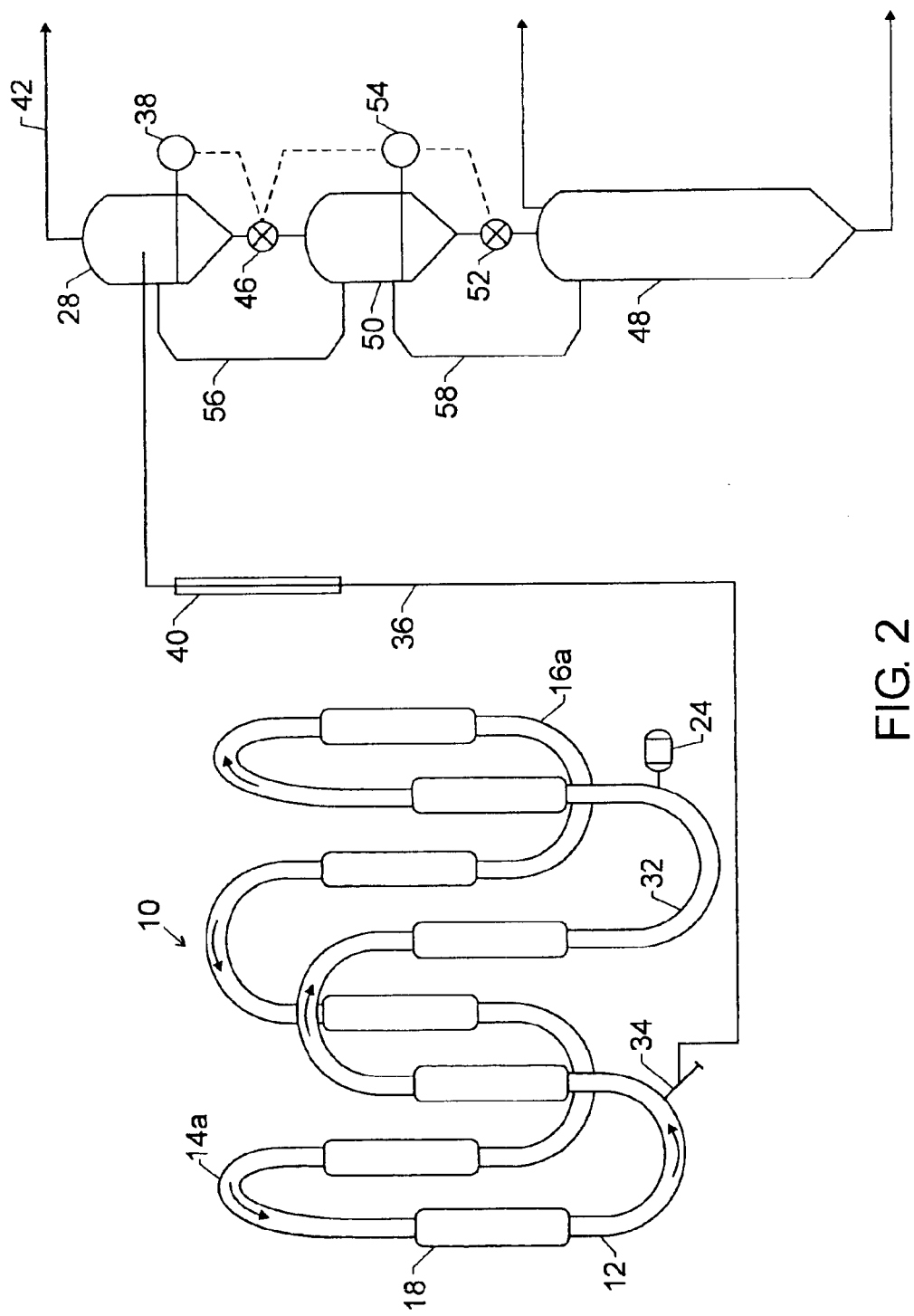
FIG. 2 shows a slurry polymerization system comprising an intermediate pressure tank, cycling valves, a fluff chamber, a purge column and pressure equalization lines.

FIG. 2 shows a system that includes a fluff chamber and cycling valves. In this system the loop reactor 10 comprises major segments 12 joined together by upper curved segments 14a and lower curved segments 16a. The fluff chamber 50 is located after the intermediate pressure chamber, or more particularly after the control valve 46 for the solids outlet 44. The control valve 46 may be a cycling ball valve positioned upstream of the fluff chamber 50, and a second cycling ball valve 52 may be positioned downstream of the fluff chamber 50. The fluff chamber 50 may act as a let down chamber, for letting down the pressure of the material being transferred from the intermediate pressure chamber 28.

The cycling ball valves 46 and 52 operate so that the top valve opens while the bottom is closed. During this period, the fluff chamber 50, is filled with polymer solids from the intermediate pressure flash chamber 28, to a desired level or amount of polymer solids, not to exceed the maximum allowable capacity. When the desired level or amount is reached, the top valve 46 closes and the bottom valve 52 opens, and the polymer solids are transferred to a relatively lower pressure vessel, such as a purge column 48. These steps are repeated as needed to transfer the material from the intermediate pressure chamber 28 to the purge column 48.

The opening and closing of the valves may be based on a timer or a level indicator 54 associated with the fluff chamber. The valves may be operated so that the fluff chamber is greater than 85 percent filled, alternatively greater than 95 percent filled, alternatively substantially full. Pressure drop and wear on the valves 46 and 52 can be minimized by maintaining a first gas passage 56 for gas from the intermediate pressure chamber 28 to the fluff chamber 50 and a second gas passage 58 from the fluff chamber 50 to the low-pressure destination 48. This discontinuous transfer process results in less gas leakage to the low-pressure destination 48 than a continuous process.

The intermediate pressure chamber may be supported above the purge column. The solids that exit the intermediate pressure chamber are fed to the purge column by gravity through a fluff chamber isolated by two valves. The fluff chamber has a clean-out screen and valves to isolate the operating valves for maintenance. Structure supports the intermediate pressure chamber, fluff chamber and operating and isolating valves high in the air.

Alternatively, the design may be modified to replace the fluff chamber between the intermediate pressure zone and the purge zone with a transporter tank, which is another technique for transferring polymer solids from an intermediate pressure zone to a lower pressure zone. Transporter tanks are also known referred to as blow tanks or as a solids pump (see Zenz, "Fluidization and Fluid-Particle Systems" 1989, p. 665, which is incorporated herein by reference). A transporter tank may be used in place of the fluff chamber and valves between the intermediate pressure zone and the purge zone (or other lower pressure zone). In the present improvement, the transporter tank may be combined with the chamber that contains the intermediate pressure zone, with the top half of the chamber being a high efficiency cyclone. A metal filter may be used on top of the cyclone.

Figure 3:
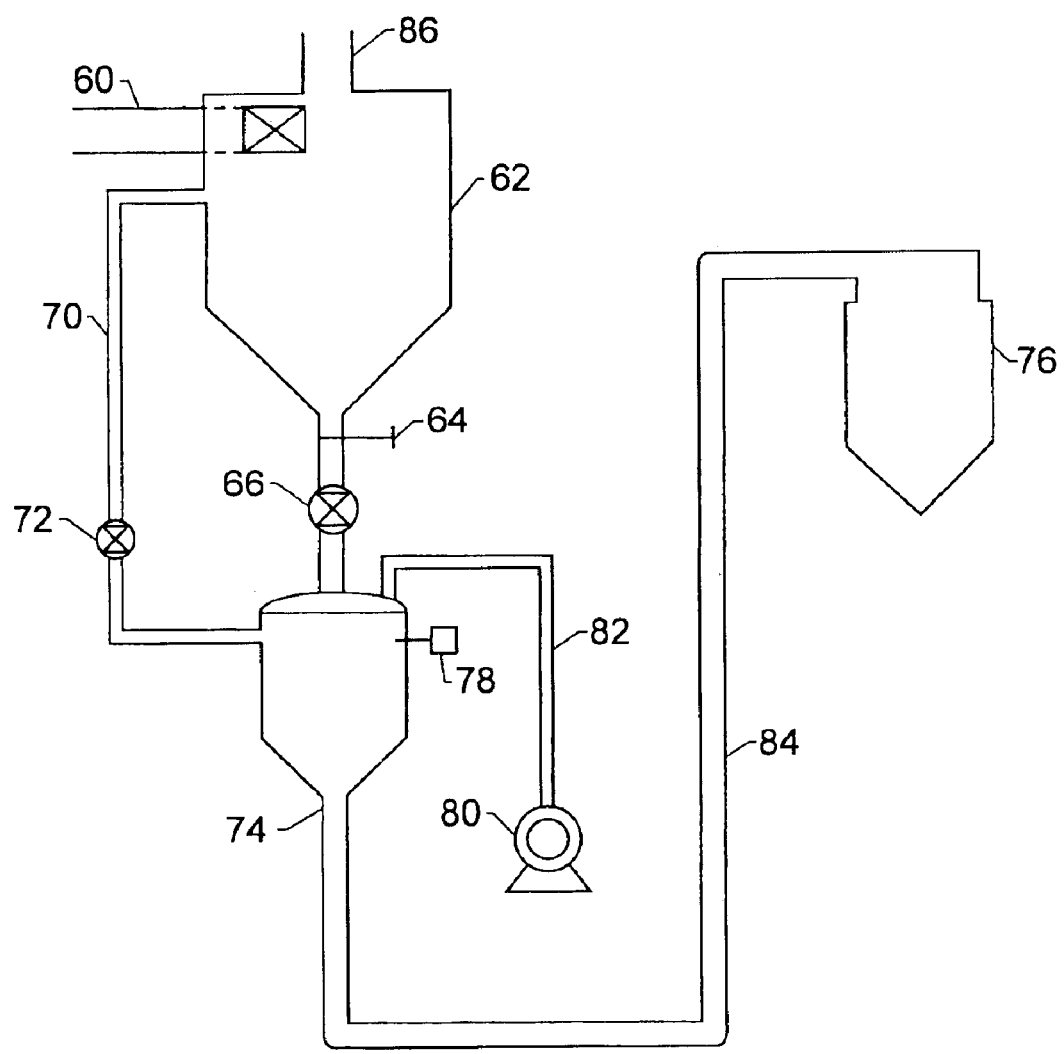
FIG. 3 shows a diluent separation system comprising a transporter tank after an intermediate pressure tank.

FIG. 3 shows arrangement that includes a transporter tank after an intermediate pressure tank. In FIG. 3, a stream comprising polymer solids, vaporized and/or liquid diluent, and other components from a slurry polymerization are fed through inlet 60 to an intermediate pressure tank 62. The outlet of this tank 62 is equipped with a manual gate 64 that may be closed when one wants to seal the outlet for an out-of-the-ordinary purpose. The manual gate 64 will generally remain open during normal operation, during which an outlet valve 66 regulates the flow of material out of the tank 62. The material (polymer solids or a concentrated slurry) passes through valve 66 to the transporter tank 68. A vent line 70 is provided between the transporter tank 68 and the intermediate pressure tank to allow easier filling of the transporter tank 68 and to prevent back pressure that would hinder material flow. The vent line 70 is equipped with a vent valve 72. When the transporter tank 68 is substantially filled or the material therein reaches a desired level, the vent valve 72 and outlet valve 66 are closed and sealed. High pressure gas such as pressurized air is gradually fed to the top of the transporter tank 68, and the material is forced by gas pressure through the transporter outlet 74 to the next processing stage. In this way, the material from the intermediate pressure tank 62 may be transported primarily by a force other than gravity such as by the pressure of the high pressure gas, and it is not necessary to suspend the intermediate pressure tank 68 high above the ground. The material from the transporter tank 68 will typically be passed to a receiving tank 76 where the material is separated from the high pressure gas. The level of material in the transporter tank 68 may be sensed by a level detector 78. The high pressure gas may be provided by an air compressor 80.

Several advantages are realized by these designs employing transporter tanks: (1) Structure and cost are minimized since the intermediate pressure tank can be located nearer ground level, (2) Valves for the transporter tank are smaller and cost less than the valves associated with the fluff chamber, (3) Heat can be added to the fluff in the line from the transporter tank which would lessen the amount of hydrocarbon transferred.

Another option is to effectively combine the intermediate pressure tank and the transporter tank as a single tank. The top of the tank could be designed as a high efficiency cyclone and a metal filter could be used on the top of the cyclone. When the bottom valve on the transporter tank opens, the material is transported by the flash gas from the high-pressure flash tank at about 135 psig to the top of the purge column. Polymer transport can take place by dense phase conveying until the line is clear. Alternately, the conveying line could be operated continuously with the transporters valve fully or partially open for coarse adjustment of flow. Fine flow and solids transportation rate adjustment could be achieved by varying the amount of boost gas added to the dense phase conveying line. This gas rate could be controlled by level in the bottom of the transporter. Thus, this eliminates the cycling movement of the very large valves typically used below the flash chamber and also the cycling of the 2 transporter tanks.

Alternatively or additionally, one may use two transporter tanks in combinations of flash tanks and interlock chamber cyclones. A spare cyclone transporter tank would allow for clean out of polymer chunks, should they occur. Polymer solids and diluent from the reactor discharge would enter one of the transporter tanks tangentially. The polymer solids would fall to the bottom and gas would flow out of the top. When a sufficient level built up in the transporter tank, the flow would be switched to the other transporter tank. The valve on the bottom of the first transporter tank is open and dense phase flow of slurry is sent to the top of the purge column. When the transporter is emptied of solids, as indicated by a characteristic sound or a level detector, the bottom valve is closed. When the second tank is full, flow from the reactor is switched back to the first tank and the second tank is emptied. Tuning of the timing or level control in the tank would allow the tank to avoid becoming completely empty and lead to the release of high pressure flash gas, so that the bottom ball valve of the transporter sends the minimum of flash gas to the purge column.

The advantages of a system that combines the intermediate pressure tank and the transporter tank include: (1) the flash chamber and purge column structure can be minimized. Plants without high pressure flash tanks can be retrofitted with high pressure flash more economically. (2) Clean out screens could be located at ground level in a location away from the reactor and finishing. (3) The valves for the transporter will probably be much smaller than the valves for the interlock chamber. (4) The smaller valve would not have to frequently cycle open and closed and thus have a much higher steam factor. This is a way to continuously control the flow of solids and gas without a cycling valve in slurry service. (5) Heat may be added to the fluff in the transfer line to the purge column using more flashline heaters.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

We claim:

1. An apparatus for separating diluent from polymer solids, the apparatus comprising:
   an intermediate pressure chamber adapted to separate diluent vapor from polymer solids, the chamber having an inlet adapted to receive a fluid slurry comprising diluent and polymer solids from a slurry reactor, a solids outlet adapted to discharge the polymer solids, and a gas outlet adapted to discharge the diluent vapor;
   a level sensor adapted to sense a level of polymer solids in the intermediate pressure chamber;
   an outlet valve fluidly connected to the solids outlet of the intermediate pressure chamber, wherein the outlet valve is adapted to be manipulated in response to the sensed level;
   a condenser fluidly connected to the gas outlet, the condenser adapted to receive and condense without compression the diluent vapor; and
   a purge column fluidly connected to the outlet valve, the purge column adapted to receive the polymer solids from the intermediate pressure chamber.

2. The apparatus of claim 1, comprising:
   a fluff chamber downstream of and fluidly connected to the outlet valve;
   a fluff chamber valve fluidly connected to a bottom potion of the fluff chamber, and fluidly connected to the purge column; and
   a control device adapted to operate the outlet valve and the fluff chamber valve so that the outlet valve and the fluff chamber valve are not open at the same time.

3. The apparatus of claim 2, wherein the fluff chamber houses a rotating device adapted to avoid polymer build-up and clogging.

4. The apparatus of claim 2, wherein the fluff chamber has an angled bottom and a surface finish that facilitates plug flow of the polymer solids.

5. The apparatus of claim 2, comprising a flashline disposed between and fluidly connecting the intermediate pressure chamber and the slurry reactor; and a flashline heater in heat exchange relation with at least a majority of the length of the flashline.

6. The apparatus of claim 1, comprising a first transporter tank downstream of and fluidly connected to the outlet valve.

7. The apparatus of claim 6, wherein the first transporter tank is upstream of and fluidly connected to the purge column.

8. The apparatus of claim 6, comprising:
   a second transporter tank downstream of and fluidly connected to the outlet valve; and
   a transporter tank controller operatively connected to the first and second transporter tanks, the controller adapted to alternate a flow of polymer solids between the first and second transporter tanks.

9. The apparatus of claim 1, wherein the intermediate pressure chamber comprises a transporter tank.

10. An apparatus for separating diluent from polymer solids, the apparatus comprising:
    an intermediate pressure chamber in which diluent is separated from polymer solids;
    a fluid passage connected at one end to a bottom portion of the intermediate pressure chamber;
    a purge column connected at an opposite end of the fluid passage;
    a condenser fluidly connected to a flash gas outlet of the intermediate pressure chamber, the condenser adapted to receive and condense without compression vaporized diluent from the intermediate pressure chamber; and
    a recycle line adapted to transfer condensed diluent to a slurry reactor, wherein the apparatus for separating diluent from polymer solids does not comprise a low pressure flash chamber.

11. The apparatus of claim 10, comprising:
    an outlet valve disposed along the fluid passage;
    a fluff chamber downstream of and fluidly connected to the outlet valve;
    a fluff chamber valve disposed along the fluid passage and fluidly connected with a bottom portion of the fluff chamber; and
    a control system adapted to operate the outlet valve and the fluff chamber valve so that the outlet valve and the fluff chamber valve are not open at the same time.

12. The apparatus of claim 11, wherein the fluff chamber houses a rotating device adapted to reduce polymer build-up and clogging.

13. The apparatus of claim 10, wherein the fluff chamber has an angled bottom and a surface finish that facilitates plug flow of the polymer solids.

14. The apparatus of claim 10, comprising a flashline fluidly connected with and upstream of the intermediate pressure chamber; and
    a flashline heater in heat exchange relation with at least a majority of the length of the flashline.

15. The apparntus of claim 10, comprising a timer adapted to control an operating position of the outlet valve, wherein the operating position comprises an opened position and a closed position.

16. The apparatus of claim 10, comprising a first transporter tank downstream of and fluidly connected to the outlet valve.

17. The apparatus of claim 16, wherein the first transporter tank is upstream of and fluidly connected to a purge column.

18. The apparatus of claim 16, further comprising:
    a second transporter tank downstream of and fluidly connected to the outlet valve; and
    a transporter tank controller operatively connected to the first and second transporter tanks, the controller adapted to alternate a flow of polymer solids between an inlet of the first transporter tank and an inlet of the second transporter tanks.

19. The apparatus of claim 10, wherein the intermediate pressure chamber is adapted to operate as both a flash chamber and a transporter tank.

* * * * *